US007653612B1

(12) United States Patent
Veeraswamy et al.

(10) Patent No.: US 7,653,612 B1
(45) Date of Patent: Jan. 26, 2010

(54) DATA PROTECTION SERVICES OFFLOAD USING SHALLOW FILES

(75) Inventors: Sairam Veeraswamy, Westborough, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 322 days.

(21) Appl. No.: 11/692,881

(22) Filed: Mar. 28, 2007

(51) Int. Cl.
*G06F 17/30* (2006.01)
(52) U.S. Cl. .............................................. 707/1; 707/8
(58) Field of Classification Search ...................... 707/1, 707/100, 206, 2, 3, 8, 201
See application file for complete search history.

(56) References Cited

U.S. PATENT DOCUMENTS

| | | | |
|---|---|---|---|
| 5,526,482 A | 6/1996 | Stallmo et al. | |
| 5,790,773 A | 8/1998 | DeKoning et al. | |
| 5,819,292 A | 10/1998 | Hitz et al. | |
| 5,835,954 A | 11/1998 | Duyanovich et al. | |
| 5,893,140 A | 4/1999 | Vahalia et al. | |
| 6,081,875 A | 6/2000 | Clifton et al. | |
| 6,324,581 B1 | 11/2001 | Xu et al. | |
| 6,353,837 B1* | 3/2002 | Blumenau | 707/205 |
| 6,353,878 B1 | 3/2002 | Dunham | |
| 6,434,681 B1 | 8/2002 | Armangau | |
| 6,453,383 B1 | 9/2002 | Stoddard et al. | |
| 6,549,992 B1 | 4/2003 | Armangau et al. | |
| 6,594,745 B2 | 7/2003 | Grover | |
| 6,604,236 B1* | 8/2003 | Draper et al. | 717/170 |
| 6,665,689 B2 | 12/2003 | Muhlestein | |
| 6,748,504 B2 | 6/2004 | Swandon et al. | |
| 6,757,794 B2 | 6/2004 | Cabrera et al. | |
| 6,775,792 B2* | 8/2004 | Ulrich et al. | 714/6 |
| 6,907,505 B2 | 6/2005 | Cochran et al. | |
| 6,934,822 B2 | 8/2005 | Armangau | |
| 6,957,362 B2 | 10/2005 | Armangau | |
| 7,010,553 B2 | 3/2006 | Chen et al. | |
| 7,035,881 B2 | 4/2006 | Tummala et al. | |
| 7,076,509 B1 | 7/2006 | Chen et al. | |
| 7,085,909 B2 | 8/2006 | Ananthanarayanan et al. | |
| 7,107,385 B2 | 9/2006 | Rajan et al. | |

(Continued)

OTHER PUBLICATIONS

Uresh Vahalia, Unix Internals: The New Frontiers, Chapter 9, "File System Implementations," and Chapter 11, Advanced File Systems, 1996, p. 261-289, 338-371, Prentice-Hall, Inc., Upper Saddle River, New Jersey.

(Continued)

*Primary Examiner*—Cheryl Lewis
(74) *Attorney, Agent, or Firm*—Richard Auchterlonie; Novak Druce & Quigg, LLP (57) ABSTRACT

A shallow file is adapted for intensive read-only access to data of a primary file. The primary file resides in another file system or file server. The shallow file includes the data block mapping metadata of the primary file and a link to the primary file. To open the shallow file, the file system manager of the shallow file obtains a read lock on the primary file from the file system manager of the primary file. Then the file system manager of the shallow file may use the data block mapping in the shallow file to access the file data from the primary file in storage without participation of the file system manager of the primary file. This permits offloading of data protection services for secure and efficient storage of a backup copy of the file data.

20 Claims, 8 Drawing Sheets

U.S. PATENT DOCUMENTS

| | | | |
|---|---|---|---|
| 7,165,158 | B1 | 1/2007 | Yagawa |
| 2004/0030668 | A1 | 2/2004 | Pawlowski et al. |
| 2004/0030822 | A1 | 2/2004 | Rajan et al. |
| 2005/0015663 | A1 | 1/2005 | Armangau et al. |
| 2005/0065986 | A1 | 3/2005 | Bixby et al. |
| 2005/0066095 | A1 | 3/2005 | Mullick et al. |
| 2005/0149749 | A1 | 7/2005 | Van Brabant |
| 2005/0246382 | A1 | 11/2005 | Edwards |
| 2005/0256859 | A1 | 11/2005 | Keohane et al. |
| 2006/0143412 | A1 | 6/2006 | Armangau |
| 2007/0136548 | A1 | 6/2007 | Mane |

OTHER PUBLICATIONS

"Celerra File Server Architecture for High Availability," Aug. 1999, 11 pages, EMC Corporation, Hopkinton, Mass.

"Celerra File Server in the E-Infostructure," 2000, 12 pages, EMC Corporation, Hopkinton, Mass.

"Enginuity: The Symmetrix Storage Operating Environment," EMC White Paper, Jul. 2005, 21 pages, EMC Corporation, Hopkinton, Mass.

"EMC Replication Manager /SE," Data Sheet, May 2005, 4 pages, EMC Corporation, Hopkinton, Mass.

R. Stager and D. Hitz, Network Data Management Protocol, Network Working Group, internet Draft, Oct. 1996, 49 pages, The Internet Society, Reston, VA.

Uresh Vahalia, Cary C. Gray, Dennis Ting, Metadata Logging in an NFS Server, USENIX 1995, Jan. 16-20, 1995, New Orleans, Louisiana, 12 pages, the USENIX Association, Berkeley, CA.

Chutani, Sailesh, et al., "The Episode File System," Jun. 1991, 18 pages, Carnegie Mellon University IT Center, Pittsburg, PA.

Philip Trautman and Jim Mostek, "Scalability and Performance in Modern File Systems," printed May 6, 2005. 18 pages, Silicon Graphics, Mountain View, CA.

Juan I. Santos Florido, Journal File Systems, Linux Gazette, Jul. 2000, Issue 55, 11 pages, Linux Journal, Seattle, WA.

* cited by examiner

FIG. 8

DATA PROTECTION SERVICES OFFLOAD USING SHALLOW FILES

FIELD OF THE INVENTION

The present invention relates generally to file systems, and services for protecting computer data stored in files in a data processing system. In particular, the present invention relates to file system management, and data protection services that use shared access to a file in order to protect computer data stored in the file.

BACKGROUND OF THE INVENTION

In recent years, the data storage industry has been immensely successful in providing ever increasing amounts of computer data storage at decreased cost. This has permitted customers to keep vast numbers of electronic business and technical documents in computer data storage for convenient access. More recently paper documents are being replaced by electronic documents.

Electronic document retention techniques have been developed so that documents that must be retained for regulatory compliance need never be kept in paper form. Typically such a document retention technique includes making a "frozen image" of the document in a file, and keeping at least one backup copy of the file. Such a "frozen image" is guaranteed to be read-only for a retention protection interval. Keeping at least one backup copy of the file may involve data protection services for secure and efficient storage and retrieval of the backup copy. The data protection services may include virus checking, indexing, classification, de-duplication, compression, encryption, and remote replication, prior to storage of the backup copy.

SUMMARY OF THE INVENTION

A problem with data protection services may occur when the data processing upon an electronic document for the data protection services is concurrent with client access to the electronic document. The data protection services often require extensive data processing upon the entire electronic document. Slow data processing may inconvenience clients that are blocked from read-write access to the electronic document during the backup process, and may cause a noticeable decrease in responsiveness to clients having concurrent read-only access to the electronic document.

This problem is solved by using a first data processor for providing client access to the electronic document, and off-loading the data protection services to a second data processor. To avoid slow data processing that would be caused by copying the electronic document from data storage of the first data processor to data storage of the second data processor, the file system manager of the second data processor recognizes a new "shallow file" type. A shallow file copy of the electronic document is created in the data storage of the second data processor. The shallow file includes the data block mapping metadata of a primary file containing the electronic document but not the data blocks of the primary file. Instead, the shallow file includes a link to the primary file. The file system manager of the second data processor uses the data block mapping metadata to access directly the data blocks of the primary file in storage.

In accordance with one aspect, the invention provides a method of operation in a data processing system. The data processing system has a first data processor programmed with a first file system manager for managing access to a first file system, and a second data processor programmed with a second file system manager for managing access to a second file system. The first file system includes a first file. The first file has data blocks in computer data storage, and the first file has data block mapping metadata mapping the data blocks of the first file to respective addresses in the computer data storage of the data blocks of the first file. The method includes creating a second file in the second file system. The second file includes a copy of the data block mapping metadata in the first file, and the second file also includes a link to the first file. The method further includes the second file system manager receiving a request from an application to read a specified data block from the second file, and responding to the request from the application by accessing the data block mapping metadata in the second file to obtain a respective address in the computer data storage for the specified data block in the first file, and the second file system manager formulating a storage access request for reading data from the respective address in the computer data storage of the specified data block in the first file, and the second file system manager sending the storage access request to the computer data storage. The method further includes the computer data storage responding to the storage access request by reading data from the respective address in the computer data storage of the specified data block in the first file. Finally, the method includes returning to the application the data read from the respective address in the computer data storage of the specified data block in the first file.

In accordance with another aspect, the invention provides a data processing system. The data processing system includes a first data processor, a second data processor coupled to the first data processor for exchange of requests and data, and computer data storage coupled to the first data processor and the second data processor for storage and retrieval of data from the first data processor and the second data processor. The first data processor is programmed with a first file system manager for managing access to a first file system in the computer data storage, and the second data processor is programmed with a second file system manager for managing access to a second file system in the computer data storage. The first file system includes a first file. The first file has data blocks in the computer data storage. The first file also has data block mapping metadata mapping the data blocks of the first file to respective addresses in the computer data storage of the data blocks of the first file. The second file system manager is programmed for creating a second file in the second file system. The second file includes a copy of the data block mapping metadata in the first file. The second file also includes a link to the first file. The second file system manager is also programmed for responding to a request from an application to read a specified data block from the second file by accessing the data block mapping metadata in the second file to obtain a respective address in the computer data storage for the specified data block in the first file, and by formulating a storage access request for reading data from the respective address in the computer data storage of the specified data block in the first file, and sending the storage access request to the computer data storage, and receiving from the computer data storage data read from the respective address in the computer data storage of the specified data block in the first file, and returning to the application the data read from the respective address in the computer data storage of the specified data block in the first file.

In accordance with yet another aspect, the invention provides a data processing system including a first file server and a second file server. The second file server is coupled to the first file server for exchange of requests and data. The first file server includes a first data processor and first disk storage coupled to the first data processor for storage and retrieval of data from the first data processor. The second file server includes a second data processor and second disk storage coupled to the second data processor for storage and retrieval of data from the second data processor. The first data processor is programmed with a first file system manager for managing access to a first file system in the first disk storage, and the second data processor is programmed with a second file system manager for managing access to a second file system in the second disk storage. The first file system includes a first file. The first file has data blocks in the first disk storage, and the first file has data block mapping metadata mapping the data blocks of the first file to respective addresses in the first disk storage of the data blocks of the first file. The second file system manager is programmed for creating a second file in the second file system. The second file includes a copy of the data block mapping metadata in the first file. The second file also includes a link to the first file. The second file system manager is also programmed for responding to a request from an application of the second file server to read a specified data block from the second file by accessing the data block mapping metadata in the second file to obtain a respective address in the first disk storage for the specified data block in the first file, and by formulating a storage access request for reading data from the respective address in the first disk storage of the specified data block in the first file, and sending the storage access request to the first disk storage, and receiving from the first disk storage data read from the respective address in the first disk storage of the specified data block in the first file, and returning to the application the data read from the respective address in the first disk storage of the specified data block in the first file.

BRIEF DESCRIPTION OF THE DRAWINGS

Additional features and advantages of the invention will be described below with reference to the drawings, in which.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

Figure 1:
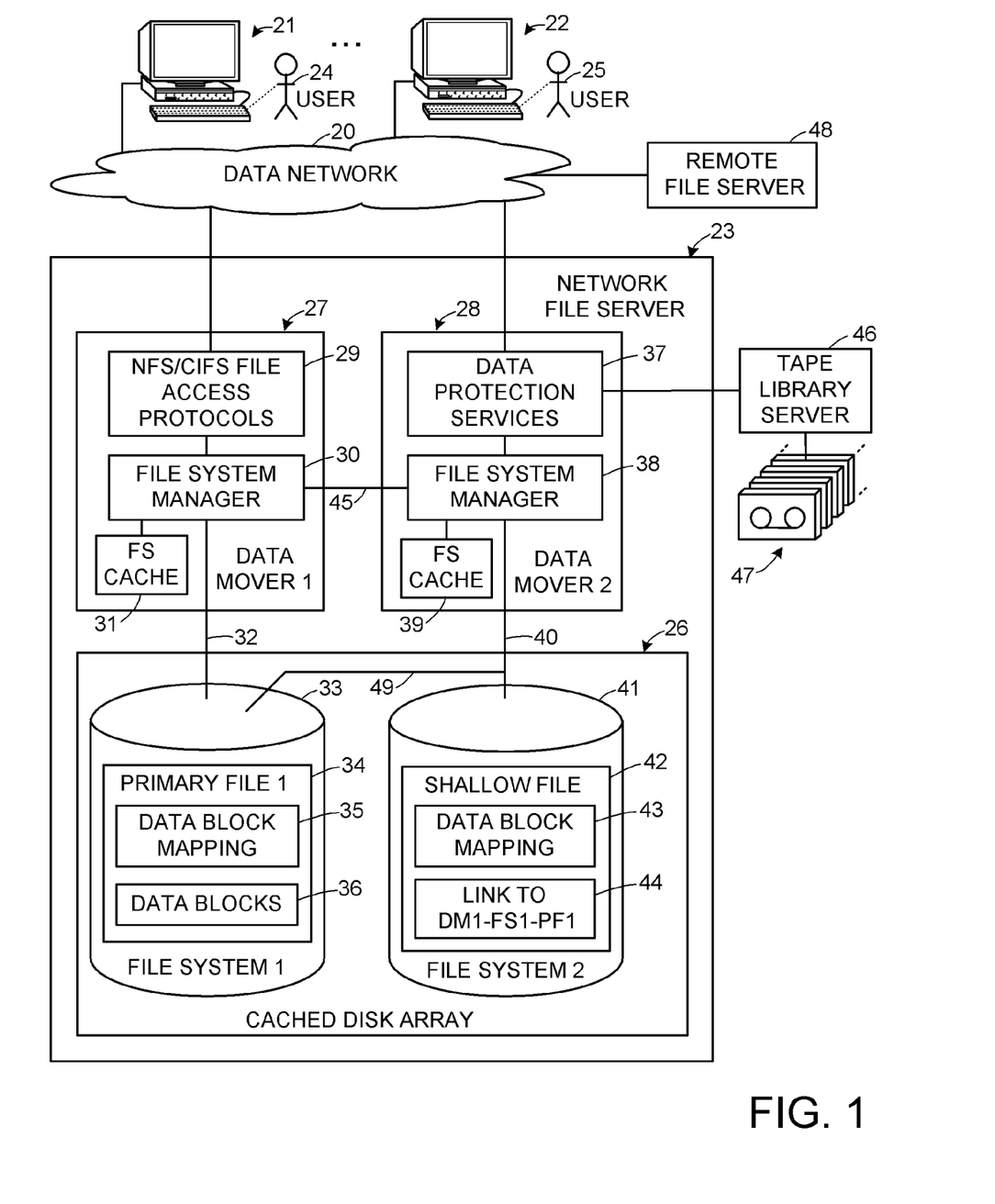
FIG. 1 is block diagram of a data processing system in accordance with one implementation of the invention.

With reference to FIG. 1, there is shown a data processing system incorporating the present invention. The data processing system includes a data network 20 interconnecting clients 21, 22 and servers such as a network file server 23 and a remote file server 48. The data network 20 may include any one or more of network connection technologies, such as Ethernet, and communication protocols, such as TCP/IP. The clients 21, 22, for example, are workstations such as personal computers using either the UNIX® operating system or the Microsoft WINDOWS® operating system. The workstations are operated by human users 24, 25.

The network file server 23 includes a cached disk array 26 and data mover computers 27, 28 coupled to the cached disk array via respective data links 32 and 40. The network file server 23 is managed as a dedicated network appliance, integrated with popular network file systems in a way, which, other than its superior performance, is transparent to the end user. The data movers 27, 28, for example, are high-end commodity computers. Further details regarding the construction of a network file server using data mover computers and a cached disk array are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

A first data mover 27 in the network file server 23 is programmed primarily for servicing network client requests for access to files stored in the cached disk array 26. The programming of the first data mover 27 includes a file access protocols module 29 for communicating with the network clients in accordance with the Network File System (NFS) file access protocol or the Common Internet File System (CIFS) file access protocol. The programming of the first data mover 27 also includes a file system manager module 30 for managing a hierarchical file system 33 of directories and files stored in the cached disk array 26, and also managing a random access memory cache 31 of recently accessed file system data and metadata. A file 34 in the file system 33 includes data blocks 36 containing data written to the file, and data block mapping metadata 35 indicating where each data block in the extent of the file is stored in the logical block address space of the cached disk array 26. For example, the file system is a UNIX®-based file system managed as described in Uresh Vahalia, *Unix Internals: The New Frontiers*, Chapter 9, "File System Implementations," Prentice-Hall, Inc., New Jersey, 1996, p. 261-289.

The second data mover 28 is programmed primarily for providing data protection services for the file system 33 managed by the first data mover 28. Thus, the first data mover 28 functions as a primary file server for servicing requests from the network clients for access to the file system 33, and the second data mover 28 functions as a data protection server for providing data protection services to the primary file server 27. The second data mover 28 is programmed with a data protection services application 37, and a file system manager 38 for maintaining a file system cache 39 and providing access to a file system 41 stored in the cached disk array 26.

In accordance with an aspect of the present invention, the file system manager 38 recognizes a new file type called a "shallow file." A shallow file includes data block mapping metadata for data blocks that are not included in the shallow file and instead are included in an associated file in another file system or file server. The file that is associated with the shallow file and that includes the data blocks is called the primary file of the shallow file. The shallow file also includes a link to the primary file for binding the shallow file to its primary file. As shown in FIG. 1, for example, a shallow file 42 is stored in the file system 41 managed by the file system manager 38 of the second data mover 28. The shallow file 42 includes a link 44 to the file 34 in the file system 33 managed by the file system manager 30. Thus, the file 34 is the primary file of the shallow file 42.

Preferably the target of the link 44 identifies an address for sending a file access request to the file server and file system manager that manages the file system containing the primary file, and also identifies an address for direct access to the storage containing the data blocks of the primary file. For example, in the network file server 23 of FIG. 1, the file system manager 38 may open the shallow file 42 by requesting the file system manager 30 to place a read lock on the primary file in storage. The file system manager 38 sends lock and unlock requests to the file system manager 30 over a link 45 from the second data mover 28 to the first data mover 30. When the shallow file 42 is open, the file system manager 38 may read the data of a specified block in the extent of the primary file by using the data block mapping metadata 43 in the shallow file 42 to translate the specified block number in the extent to a corresponding logical block address in storage of the cached disk array, and then sending a read request specifying the corresponding logical block address over a link 40 from the second data mover 28 to the cached disk array. Inside the cached disk array 26, the read request is transmitted over a link 49 to disk drives storing the first file system 33, and the requested data is returned over the link 49 and over the link 40 to the second data mover 28.

For replicating and archiving file data, the data protection services 37 may access the shallow file 42 as if it were a copy of the primary file 34. The data protection services 37 may request the file system manager 38 to read data from the shallow file 42 in order to replicate the data to the remote file server 48 or to send the data to the tape library server 46 for archive storage on tape cartridges 47. Like a copy, the shallow file includes a copy of the metadata of the primary file, and this copy of the metadata is contained in a file system 41 separate from and independent of the file system 33 storing the primary file 34. Unlike a copy, there is no physical copying of the data blocks 36 of the primary file to the second file system 41. The second data mover 28 may access the data blocks 36 of the primary file 24 without using the data processing capability of the first data mover 27. The second data mover 28 and the first data mover 27 may share a data path in the cached disk array 26 when concurrently accessing the data blocks 36 of the primary file 34, but this sharing does not significantly impact performance of the network file server 23 because the cached disk array 26 is designed for shared access of the data movers to the storage in the cached disk array.

Figure 2:
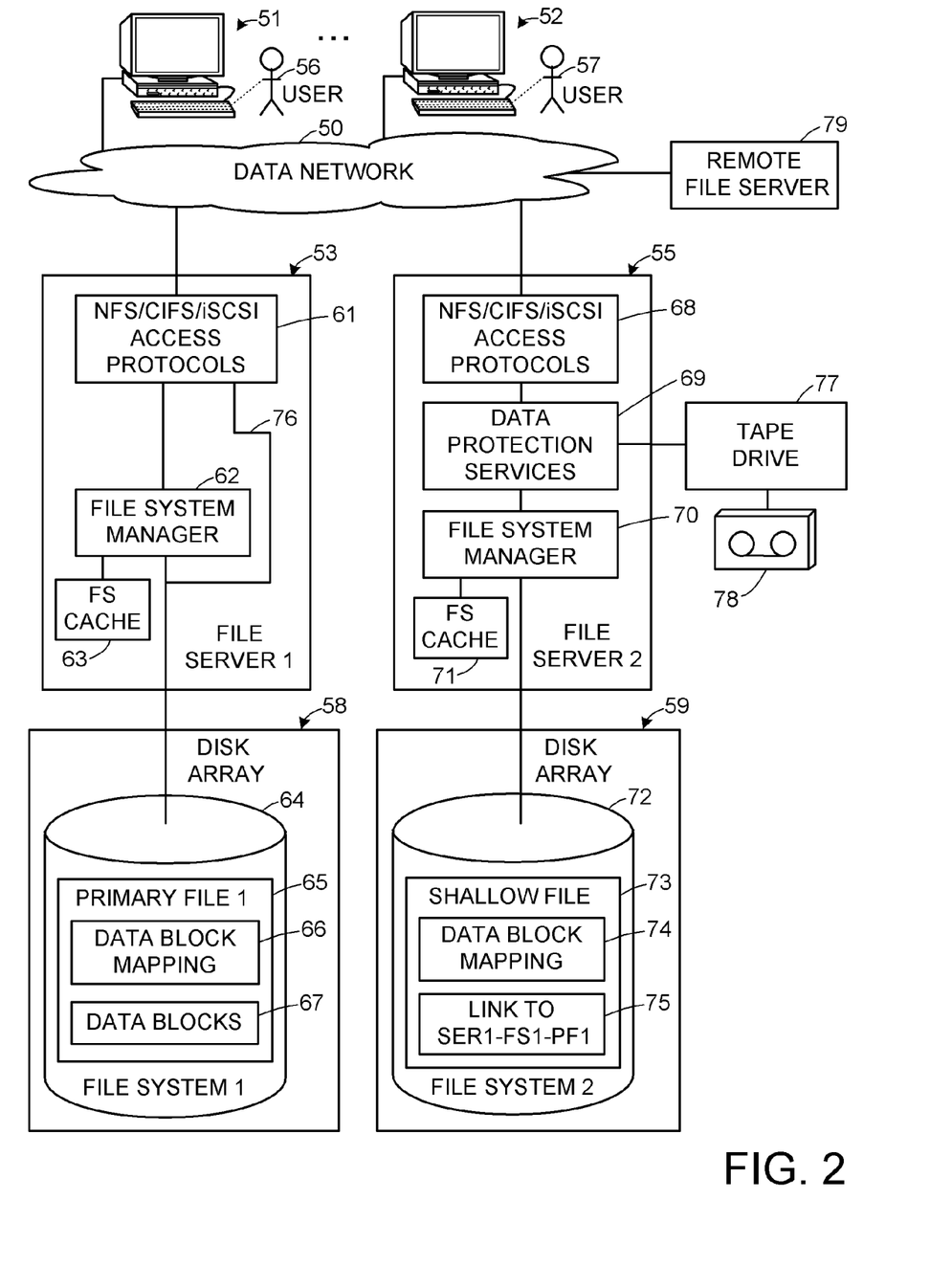
FIG. 2 is a block diagram of a data processing system in accordance with another implementation of the invention.

FIG. 2 shows another data processing system incorporating the present invention. The data processing system includes a data network 50 interconnecting network clients 51, 52, and file servers 53, 55, and 79. The network clients 51, 52 are workstations operated by human users 56, 57. Each of the file servers 53, 55 is a general purpose computer having a respective disk storage array 58, 59. Each of the file servers 53, 55 is programmed with a network file access protocols module 61, 68, and a file system manager 62, 70 for managing a respective file system 64, 72 in the disk array 58, 59 and maintaining a respective file system cache 63, 71 in random access memory of the file server. The first file server 53 is used as a primary file server for servicing requests from the network clients 51, 52 for access to a file system 64 in the disk array 58, and the second file server 55 is used as a data protection server for providing data protection services to the first file server 53. For example, the second file server 55 is programmed with a data protection services module 69 layered under the file access protocols module 68 and over the file system manager 70. The data protection services module 69 may replicate file data to a remote file server 79, and may archive file data to a tape cartridge 78 mounted on a tape drive 77 linked to the second file server 55.

For convenient and efficient access of the data protection services 69 to file data in the file system 64, the file system manager 70 is programmed to recognize the "shallow file" type. For example, to replicate or archive the data of a primary file 65 in the file system 64, the file system manager 70 of the data protection server 55 creates a shallow file copy 73 of the primary file 65 including a link 75 to the primary file, and requests the file system manager 62 of the network file server 53 to place a read lock on the primary file 65 and return the data block mapping metadata of the primary file 65. For example, the file system manager 70 of the data protection server 55 uses the NFS or CIFS protocol to send a request to the file system manager 62 of the network file server to open the primary file 65 for read access, and then sends a request to read the file mapping metadata of the primary file.

When the file system manager 70 opens the shallow file 73, the file system manager 62 of the primary file server may also return a more specific target address for the link 75, such as a file handle to the primary file 65, and a network storage address where the data storage for the file system 64 can be directly accessed in such a way as to bypass the file system manager 62. For example, the file handle of the primary file 65 includes a volume identifier of the file system 64, and an inode number of the primary file. The network storage address where the data storage for the file system 64 can be directly addressed includes an Internet Small Computer System (iSCSI) target identifier and LUN containing the logical address space of the data storage of the file system 64.

Thereafter, when the data protection services 69 sends to the file system manager 70 a request to read data from a specified block number in the extent of the shallow file 73, the file system manager 70 accesses the data block mapping 74 in the shallow file 73 in the disk array 59 in order to translate the specified block number in the extent of the shallow file 73 to a logical block address in the logical address space of the iSCSI target identifier and LUN of the file system 64 in the disk array 58. The file system manager 70 then sends an iSCSI command for reading data from this logical address at the target ID and LUN of the file system 64 over the data network 50 to the file access protocols 61 in the primary file server 53 so that the file access protocols 61 directly access the data blocks 67 in the disk array 58 over a data path 76 that bypasses the file system manager 62.

Figure 3:
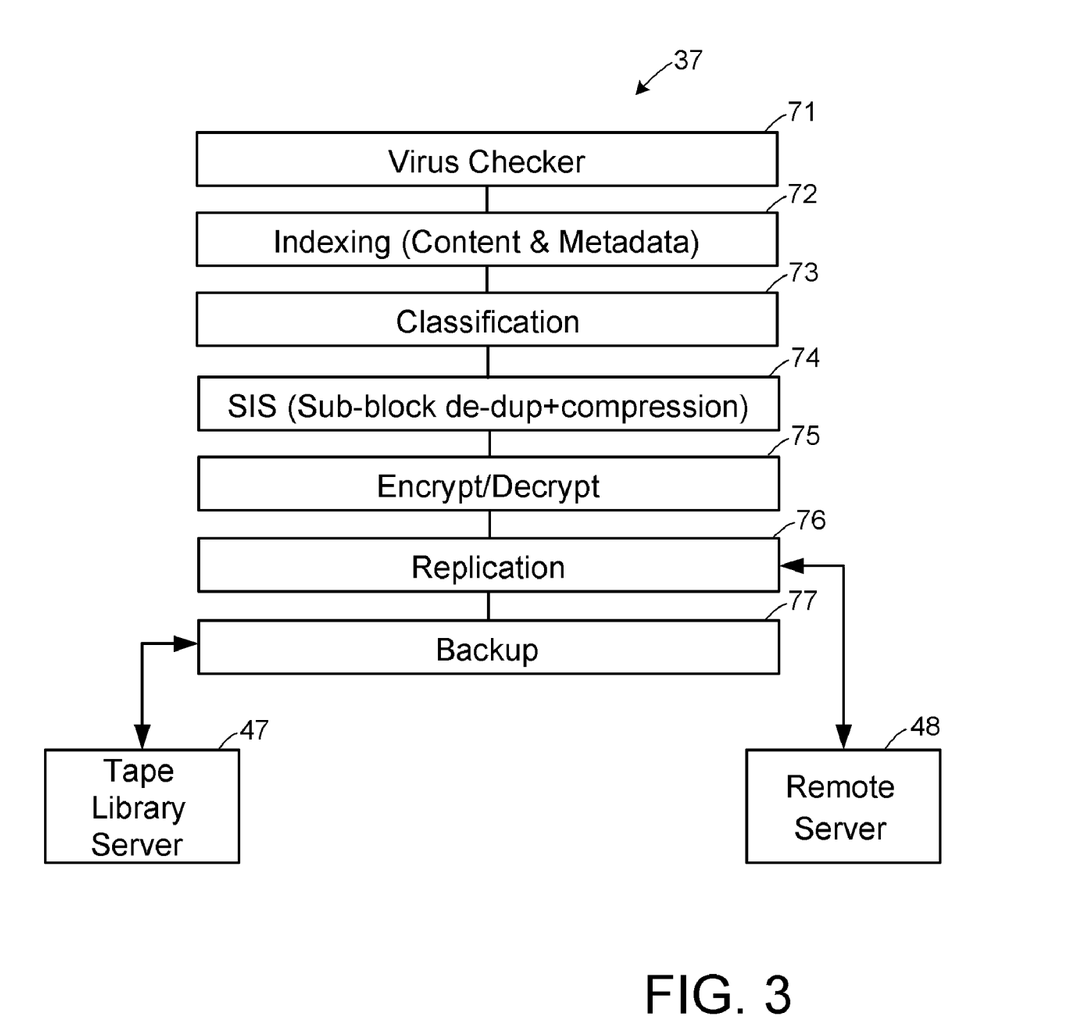
FIG. 3 shows specific data protection services that may be used in the data processing system of FIG. 1 or FIG. 2.

FIG. 3 shows various functions that may be included in the data protection services 37. Prior to replication or backup, a virus checker 71 may scan the file data for viruses. Further details regarding virus checking are found in Van Brabant, "On-Access and On-Demand Distributed Virus Scanning," US Pat. Application Pub. 2005/0149749 published Jul. 7, 2005, incorporated herein by reference. An indexing module 72 provides indexing for fast retrieval of a file upon searching for a file having specified content or metadata. For example, the indexing module 72 may compile an index such as an alphabetized list of uncommon words with pointers to where the uncommon words appear in an electronic document.

A classification module 73 classifies files by format or content. A single instance storage (SIS) module 74 provides sub-block de-duplication and data compression for conserving remote or archival storage. An encryption/decryption module 75 provides security for remote or archival storage. A replication module 76 provides replication of files to the remote server 48, and a backup module 77 provides backup of files to the tape library server 47.

Preferably the replication module 76 has a capability of determining a difference between a first file previously replicated to the remote file server and a second file to be replicated to the remote file server, so that the second file is replicated by transmitting the difference between first file and the second file to the remote file server. Further details regarding replication are found in Armangau et al., "Data Recovery with Internet Protocol Replication With or Without Full Resync," U.S. Patent Application Publication 2005/0015663, U.S. Pat. No. 7,275,177, published Jan. 20, 2005, incorporated herein by reference.

The backup module 77 may use a conventional network backup protocol such as the Network Data Management Protocol (NDMP), as described in R. Stager and D. Hitz, Internet Draft, Network Data Management Protocol (NDMP), October 1996, pp. 1-49. Further details regarding a tape library server for backup and restore are found in Dunham U.S. Pat. No. 6,353,878 issued Mar. 5, 2002, incorporated herein by reference, and in Armangau et al., U.S. Pat. No. 6,549,992 issued Apr. 15, 2003, incorporated herein by reference.

Figure 4:
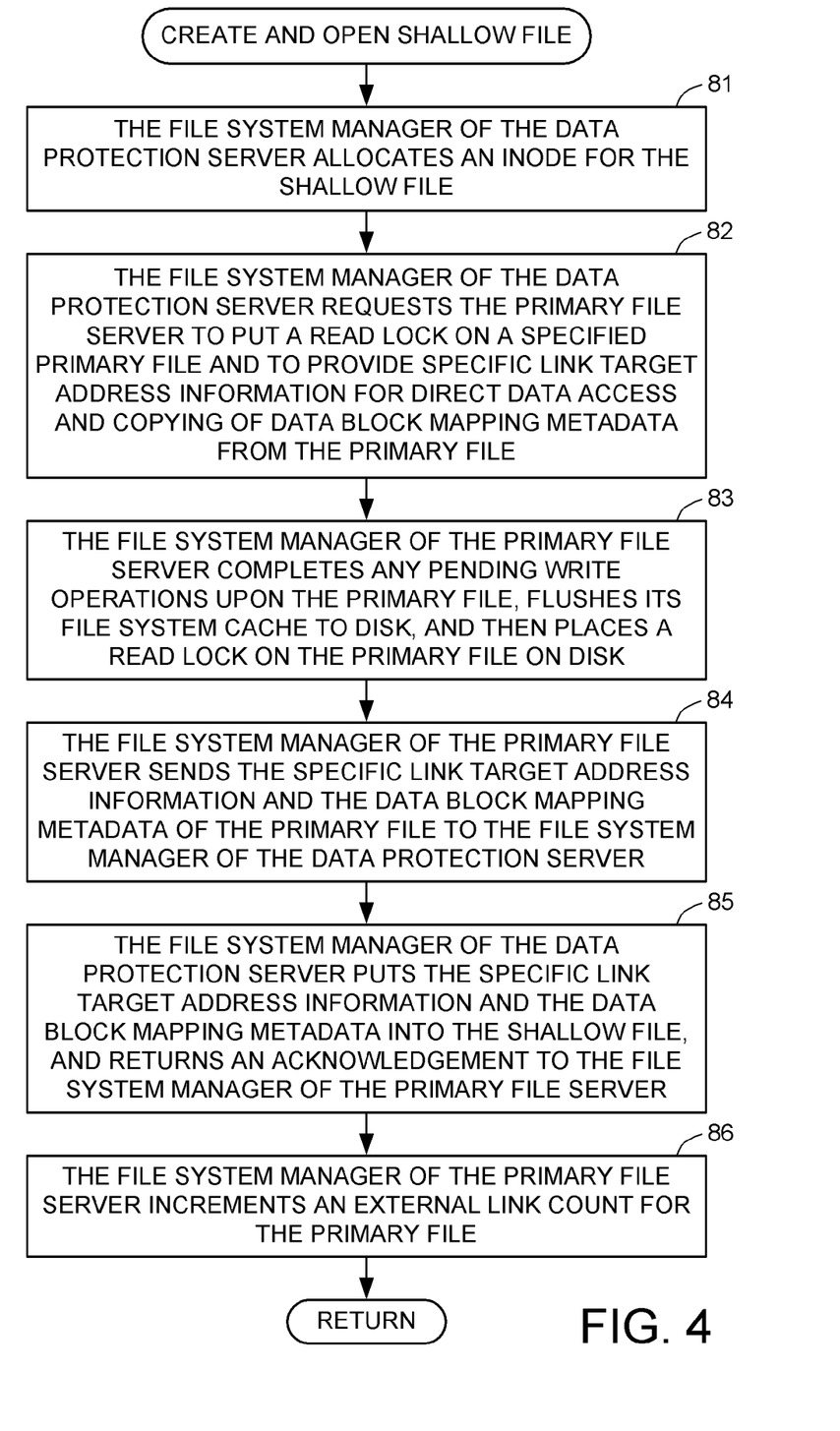
FIG. 4 is a flowchart of a procedure for creating and opening a shallow file copy of a primary file.

FIG. 4 shows a procedure for creating and opening a shallow file. In a first step 81 the file system manager of the data protection server allocates an inode for the shallow file. Next, in step 82, the file system manager of the data protection server requests the primary file server to put a read lock on a specified primary file and to provide specific link target address information for direct data access and copying of data block mapping metadata from the primary file. For example, in step 82, the file system manager of the data protection server sends a fully qualified pathname of the primary file to the file system manager of the primary file server. In step 83, the file system manager of the primary file server completes any pending write operations upon the primary file, flushes the file system cache to disk, and then places a read lock on the on-disk version of the primary file.

In step 84, the file system manager of the primary file server sends the specific link target address information and the data block mapping metadata of the primary file to the file system manager of the data protection server. In step 85, the file system manager of the data protection server puts the specific link target address information and the data block mapping metadata into the shallow file, and returns an acknowledgement to the file system manager of the primary file server. For example, the specific link target address information includes a file handle (file system ID and inode number) of the primary file, and a volume ID in the cached disk array or an IP network address and iSCSI target identifier and LUN for data of the primary file. The data block mapping metadata of the primary file could be copied to the file system manager of the data protection server by the file system manager of the primary file server sending storage block addresses of the inodes in the primary file system containing the data block mapping metadata of the primary file, and the file system manager of the data protection server reading this data block mapping metadata from these storage block addresses and writing this data block mapping metadata to the shallow file.

In step 86, the file system manager of the primary file server responds to the acknowledgement from the file system manager of the data protection server by incrementing an external link count for the primary file. The external link count is a convenient way of maintaining the read lock on the primary file for multiple shallow file copies of the primary file. The external link count for the primary file is incremented each time that a shallow file copy of the primary file is opened, and the external link count for the primary file is decremented each time that a shallow file copy of the primary file is closed. When the external link count is decremented to zero, the read lock on the primary file is released. Upon completion of step 86, the procedure is finished.

Figure 5:
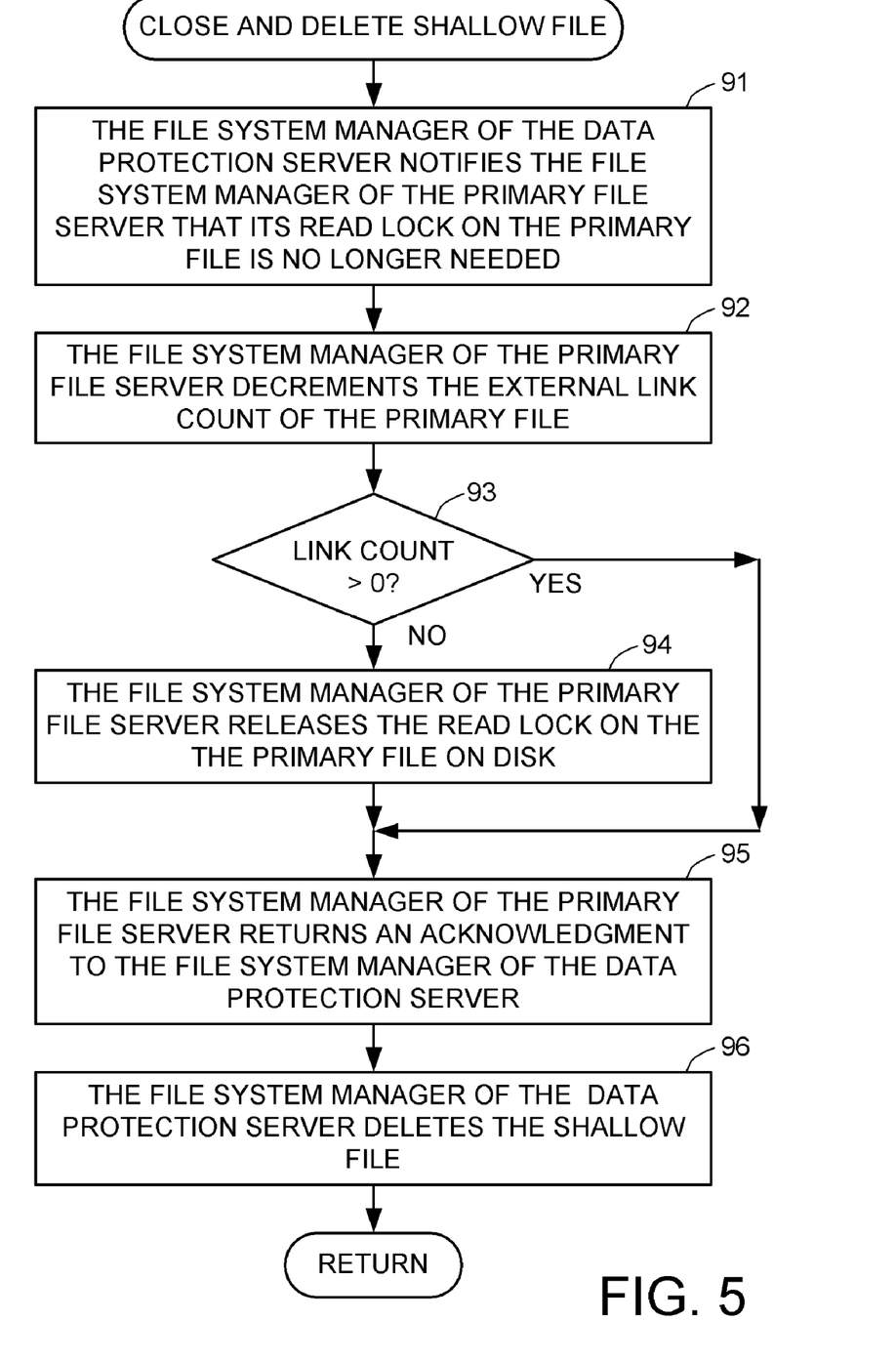
FIG. 5 is a flowchart of a procedure for closing and deleting a shallow file.

FIG. 5 shows a procedure for closing and deleting a shallow file. In step 91, the file system manager of the data protection server notifies the file system manager of the primary file server that its read lock on the primary file is no longer needed. In step 92, the file system manager of the primary file server decrements the external link count of the primary file. In step 93, if the external link count is not greater than zero, then execution continues to step 94. In step 94, the file system manager of the primary file server releases the read lock on the primary file on disk, and execution continues to step 95. Execution also branches from step 93 to step 95 if the link count is greater than zero. In step 95, the file system manager of the primary file server returns an acknowledgment to the file system manager of the data protection server. In step 96, the file system manager of the data protection server deletes the shallow file, and execution returns.

Figure 6:
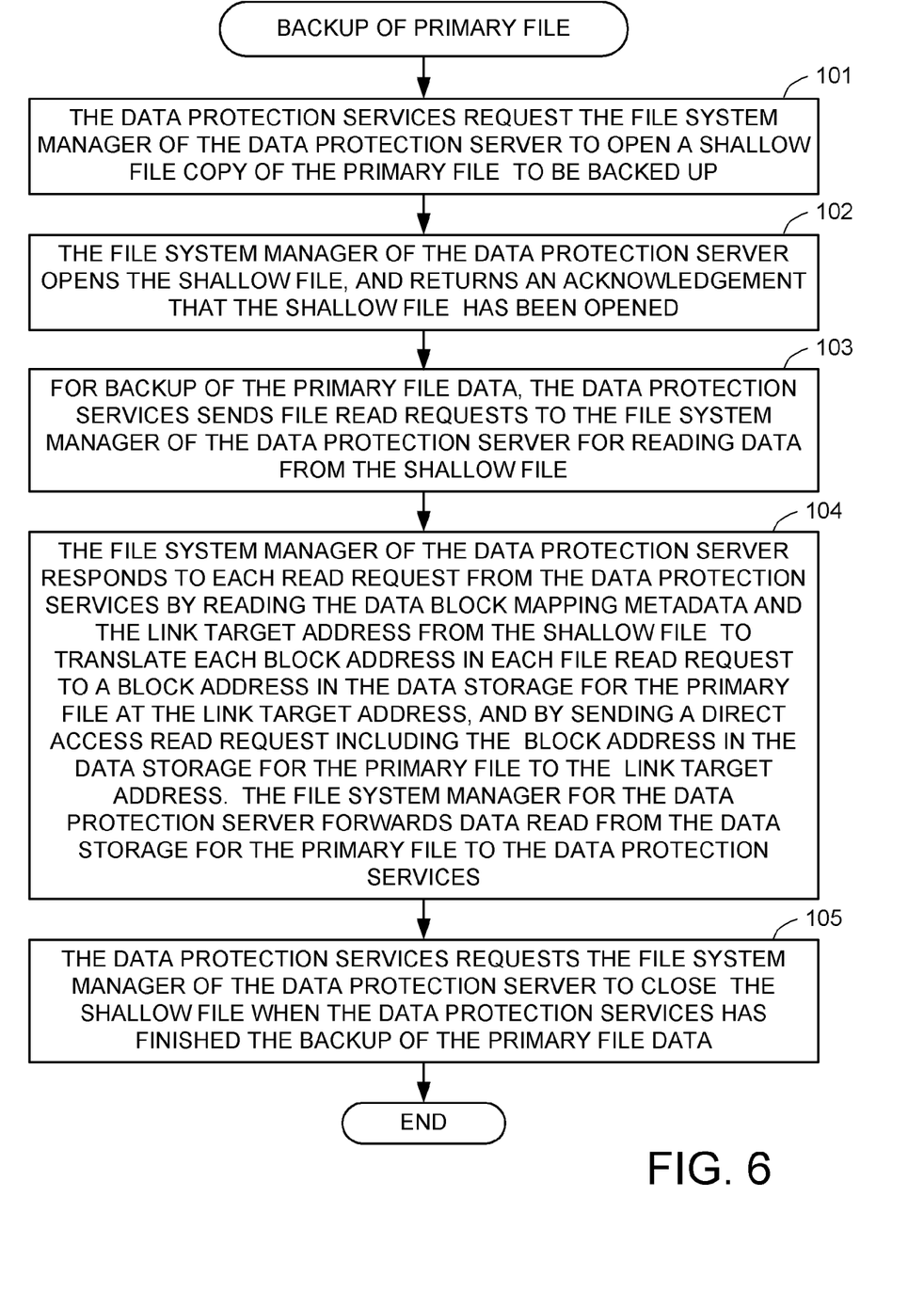
FIG. 6 is a flowchart of a procedure for using a shallow file copy of a primary file for backup of the primary file data.

FIG. 6 shows a procedure for using a shallow file copy of a primary file for backup of the primary file data. In a first step 101, the data protection services request the file system manager of the data protection server to open a shallow file copy of the primary file to be backed up. In step 102, the file system manager of the data protection server opens the shallow file, as described above with reference to FIG. 4, and returns an acknowledgement that the shallow file has been opened. In step 103, for backup of the primary file data, the data protection services sends requests to the file system manager of the data protection server for reading data from the shallow file. In step 104, the file system manager of the data protection server responds to each read request from the data protection services by reading the data block mapping metadata and the link target address from the shallow file to translate the block address in each file read request to a block address in the data storage for the primary file to formulate and send a direct access read request including the block address in the data storage for the primary file to the link target address for the data storage for the primary file. The file system manager of the data protection server forwards the data read from the data storage for the primary file to the data protection services. In step 105, the data protection services requests the file system manager of the data protection server to close the shallow file when the data protection services has finished the backup of the primary file data.

During the backup of FIG. 6, when the shallow file is open, the file system manager of the primary file server maintains a read lock on the primary file in disk storage. This may block concurrent read-write access of the network clients to the primary file. Such blocking could be eliminated by programming the primary file server with a snapshot copy facility. For example, the primary file server is constructed with a non-volatile file system cache and a non-volatile metadata transaction log so that once a read lock is placed on the primary file in disk storage, any changes to the primary file are kept in the non-volatile file system cache and in the non-volatile transaction log. Once the read lock is released, these changes are written down to the on-disk file system. Further details regarding a snapshot copy facility are found in Philippe Armangau, "Snapshot copy facility maintaining read performance and write performance," U.S. Patent Application Publication 2006/014341 published Jun. 29, 2006, incorporated herein by reference, and Bixby et al., "Maintenance of a file version set including read-only and read-write snapshot copies of a production file," U.S. Patent Application Publication US 2005/0065986, U.S. Pat. No. 7,555,504, published Mar. 24, 2005, incorporated herein by reference.

Figure 7:
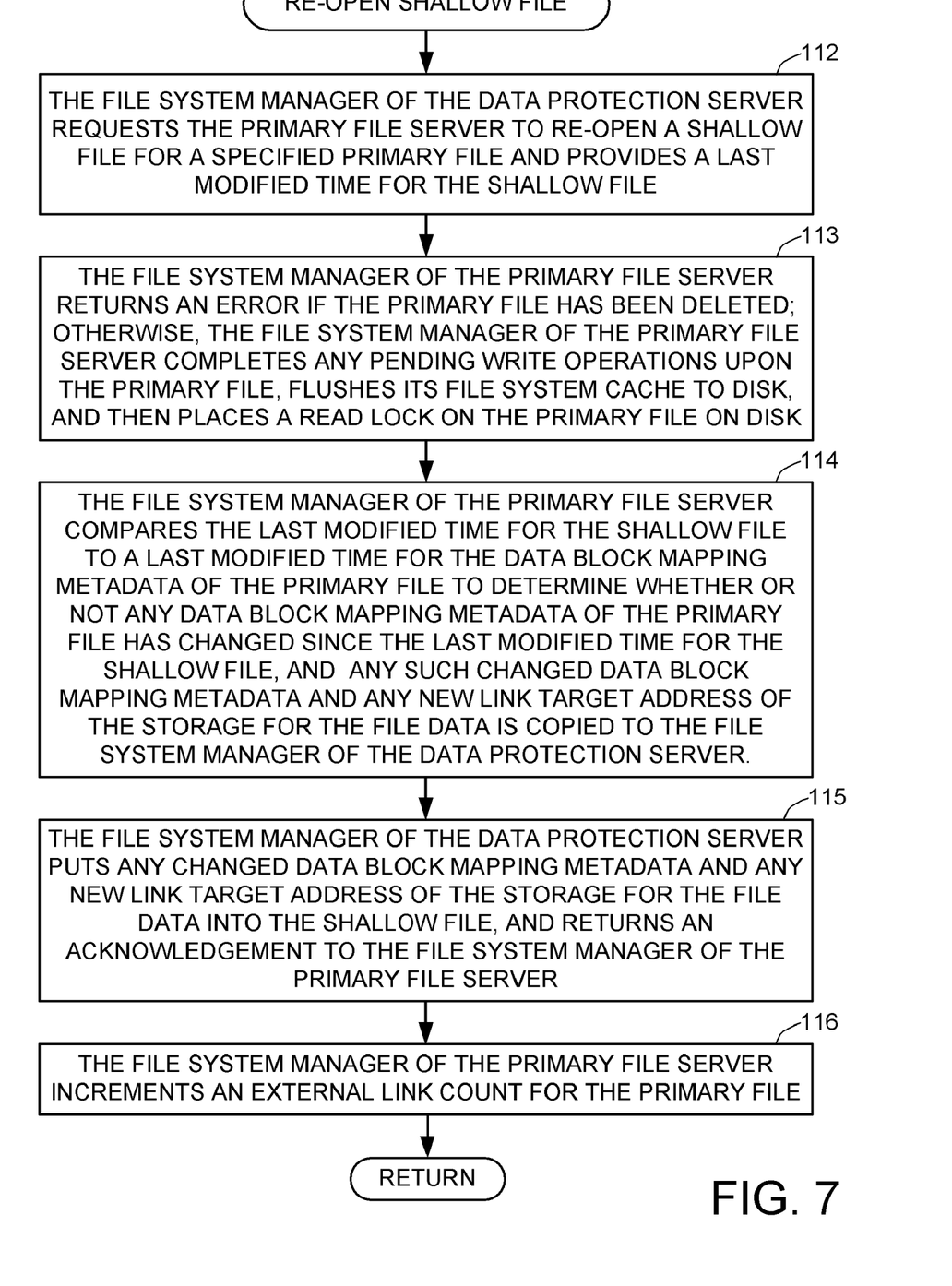
FIG. 7 is a flowchart of a procedure for re-opening a shallow file.

FIG. 7 is a flowchart of a procedure for re-opening a shallow file. When a shallow file is re-opened, it is possible that the data block mapping metadata has changed since the shallow file was last opened, and it is also possible that none of the block mapping metadata has changed since the shallow file was last opened. For example, if a file is frequently replicated or backed up, it is possible that the block mapping metadata of the file may not have changed even though the file data may have changed. For a very large file, the block mapping metadata may have changed, but the change in the block mapping metadata may have occurred in only one of many file system blocks containing data block mapping metadata of the file. If it is possible to identify when none or when specific file system blocks of data block mapping metadata have changed in the primary file since the shallow file was last opened, then considerable processing time and bandwidth can be saved by avoiding the copying of data block mapping metadata that has not changed.

One way of determining whether or not the data block mapping metadata from the primary file has changed since the last time that a shallow file copy of the primary file was last opened is for the file system manager in the primary file server to maintain a data block mapping modification time attribute of the primary file for indicating the last time that the data block mapping metadata of the primary file has been changed. The block mapping modification time attribute could include a date-time stamp and a generation count so that the presence of any change in the data block mapping metadata for the primary file would be indicated by a change in the data block mapping modification time attribute. In addition, each file system block of data bock mapping metadata could include such a data block mapping metadata modification time attribute, in order to identify specific file system blocks of data block mapping metadata that should be copied from the primary file to the shallow file copy when the shallow file copy is re-opened.

As shown in FIG. 7, in a first step 112 the file system manager of the data protection server requests the primary file server to re-open a shallow file for a specified primary file and provides a last modified time of the shallow file. In step 113, the file system manager of the primary file server returns an error if the primary file has been deleted. In this case, the block mapping metadata of the shallow file is invalid because the data block storage locations may have been re-assigned to another file. Therefore, an appropriate response of the data protection server to such an error is to delete the shallow file. If the primary file has not been deleted, then the file system manager completes any pending write operations upon the primary file, flushes its file system cache to disk, and then places a read lock on the primary file on disk.

In step 114, the file system manager of the primary file server compares the last modified time for the shallow file to a last modified time for the data block mapping metadata of the primary file to determine whether on not any data block mapping metadata of the primary file has changed since the last modified time for the shallow file, and any such changed data block mapping metadata and any new link target address of the storage for the file data is copied to the file system manager of the data protection server. In step 115, the file system manager of the data protection server puts any changed data block mapping metadata and any new link target address of the storage for the file data into the shallow file, and returns an acknowledgement to the file system manager of the primary file server. Finally, in step 116, the file system manager of the primary file server increments an external link count for the primary file.

Although the shallow file type has been described above with respect to data protection services in a data processing system, it should be understood that the shallow file type could be used for a variety of applications that otherwise might use a temporary file for copying data from one file system to another file system or from one file server to another file server. A situation that may arise in some of these applications is an impending deletion of the primary file when an application has not finished using the shallow file. If this situation can be anticipated, then the file system manager of the shallow file should convert the shallow file into a regular file.

Another situation where it would be desirable to convert a shallow file to a regular file is when an application would like to write to the shallow file. For example, an application in one file server may initially need to read a snapshot copy of a primary file in another file server. For this purpose, a shallow file copy of the primary file can be created for access by the application as a read-only snapshot copy. Later the application may need to write to the snapshot copy. For this purpose, the shallow file copy is converted to a regular file to provide a read-write snapshot copy of the primary file.

The shallow file is converted to a regular file by obtaining a read lock on the primary file if the shallow file is not presently open, and then copying the data blocks of the primary file from the file system of the primary file to the file system of the shallow file, and updating the data block mapping metadata. For convenience, the data blocks are copied to a new file in the file system of the shallow file, and when the copying is finished, the new file is substituted for the shallow file. The new file keeps the new data block mapping for the copied data blocks separate from the old data block mapping in the shallow file until the copying is finished.

Figure 8:
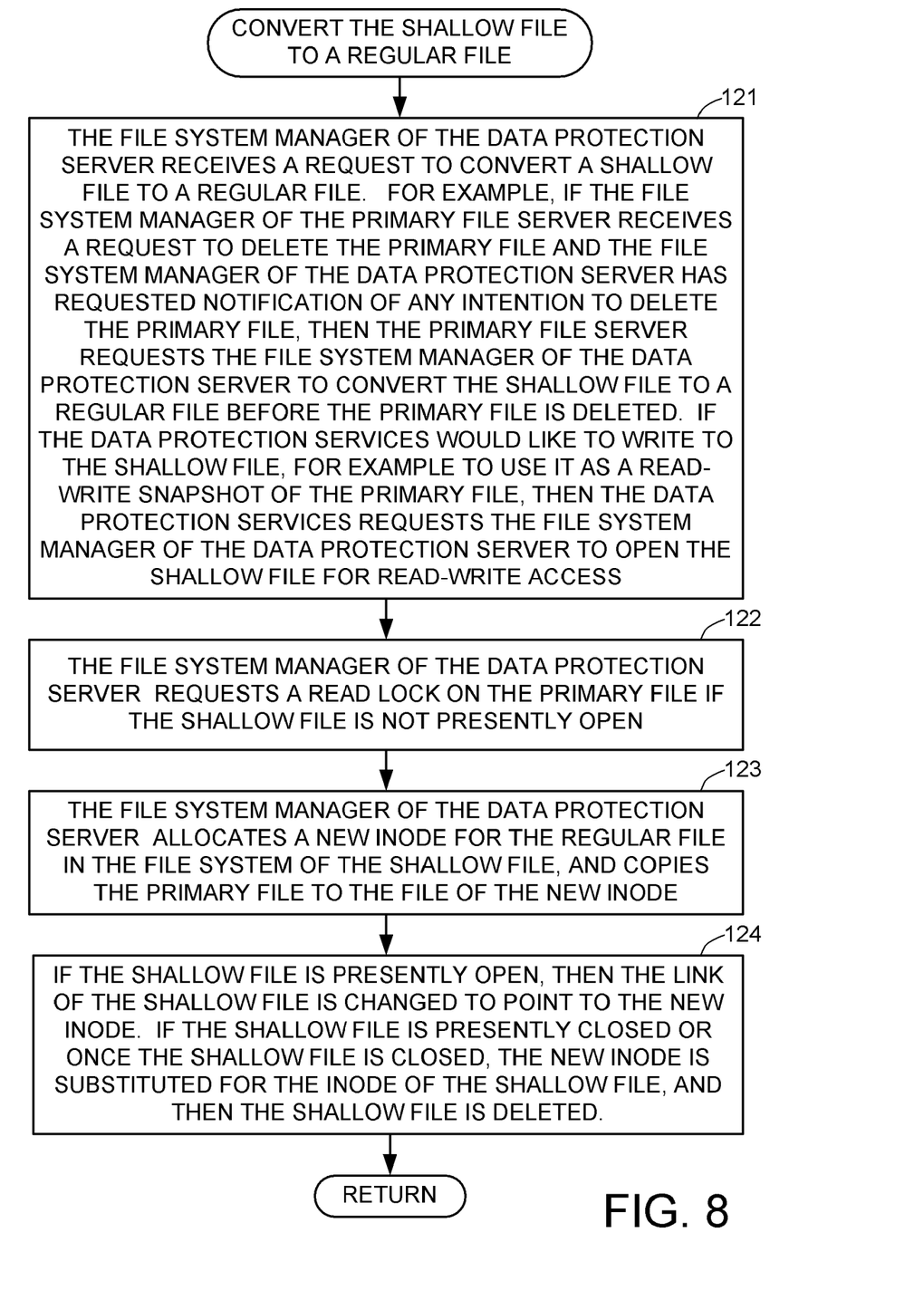
FIG. 8 is a flowchart of a procedure for converting a shallow file to a regular file.

FIG. 8 shows a specific procedure for converting a shallow file to a regular file. In step 121, the file system manager of the data protection server receives a request to convert a shallow file to a regular file. For example, if the file system manager of the primary file server receives a request to delete the primary file and the file system manager of the data protection server has requested notification of any intention to delete the primary file, then the primary file server requests the file system manager of the data protection server to convert the shallow file to a regular file before the primary file is deleted. If the data protection services would like to write to the shallow file, for example, to use it as a read-write snapshot copy of the primary file, then the data protection services requests the file system manager of the data protection server to open the shallow file for read-write access.

To convert the shallow file to a regular file, in step 122, the file system manager of the data protection server requests a read lock on the primary file if the shallow file is not presently open. (If the shallow file is presently open, there should already be a read lock on the primary file.) Next, in step 123, the file system manger of the data protection server allocates a new inode for the regular file in the file system of the shallow file, and copies the primary file to the file of the new inode. Then, in step 124, if the shallow file is presently open, then the link of the shallow file is changed to point to the new inode. If the shallow file is presently closed or once the shallow file is closed, the new inode is substituted for the inode of the shallow file so that the file of the new inode assumes the identity of the shallow file, and the old shallow file is deleted.

In view of the above, a file system manager recognizes a new "shallow file" type. A shallow file is adapted for intensive read-only access to data of a primary file. The primary file resides in another file system or file server. The shallow file includes the data block mapping metadata of the primary file and a link to the primary file. To open the shallow file, the file system manager of the shallow file obtains a read lock on the primary file from the file system manager of the primary file. Then the file system manager of the shallow file may use the data block mapping in the shallow file to access the file data from the primary file in storage without participation of the file system manager of the primary file. This permits offloading of data protection services for secure and efficient storage of a backup copy of the file data. Multiple shallow files linked to the same primary file can be open at any given time. A shallow file can be created, opened, closed, and re-opened. The data block mapping metadata and a link target address for the storage of primary file are updated when the shallow file is re-opened. A shallow file can be converted to a regular file for read-write access to the shallow file or in response to a request for deletion of its primary file. The shallow file is converted to a regular file by copying the data blocks of the primary file to the shallow file and updating the data block mapping metadata of the shallow file.

What is claimed is:

1. In a data processing system having a first data processor programmed with a first file system manager for managing access to a first file system, and a second data processor programmed with a second file system manager for managing access to a second file system, the first file system including a first file, the first file having data blocks in computer data storage, and the first file having data block mapping metadata mapping the data blocks of the first file to respective addresses in the computer data storage of the data blocks of the first file, a method comprising:
   a) the first file system manager managing access to the first file; and
   b) creating a second file in the second file system, the second file including a copy of the data block mapping metadata in the first file, the second file also including a link to the first file; and
   c) the second file system manager receiving a request from an application to read a specified data block from the second file, and responding to the request from the application by accessing the data block mapping metadata in the second file to obtain a respective address in the computer data storage for the specified data block in the first file, and the second file system manager formulating a storage access request for reading data from the respective address in the computer data storage of the specified data block in the first file, and the second file system manager sending the storage access request to the computer data storage, and
   d) the computer data storage responding to the storage access request by reading data from the respective address in the computer data storage of the specified data block in the first file, and
   e) returning to the application the data read from the respective address in the computer data storage of the specified data block in the first file.

2. The method as claimed in claim 1, which includes the first file system manager providing a network client with read access and write access to the first file, and the application providing services for protecting data of the first file.

3. The method as claimed in claim 1, which includes the second file system manager responding to a request from the application to open the second file by the second file system manager obtaining a data storage address of the first file system from the first file system manager.

4. The method as claimed in claim 1, which includes the second file system manager responding to a request from the application to open the second file by the second file system manager requesting the first file system manager to place a read lock on the first file, and which includes the second file system manager responding to a request from the application to close the second file by the second file system manager requesting the first file system manager to release the read lock on the first file.

5. The method as claimed in claim 4, wherein once the second file system manager obtains a read lock upon the first file from the first file system manager, the second file system manager reads data of the first file from the computer data storage without participation of the first file system manager.

6. The method as claimed in claim 4, wherein the first file system manager responds to the request from the second file system manager for placing a read lock on the first file by placing a read lock on the first file and incrementing a read lock count for the first file, and wherein the first file system manager responds to the request from the second file system manger for releasing the read lock by decrementing the read lock count for the first file, and releasing the read lock on the first file once the read lock count indicates zero read locks upon the first file.

7. The method as claimed in claim 4, which includes the second file system manager subsequently responding to a request from the application to re-open the second file by sending another request to the first file system manager to place a read lock on the first file, said first file system manager responding to said another request to the first file system manager by placing a read lock on the first file, and also determining whether or not any data block mapping metadata of the first file has been changed since data block mapping metadata was last copied from the first file to the second file, and the method further includes, upon determining that data block mapping metadata of the first file has been changed since data block mapping metadata was last copied from the first file to the second file, copying the changed data block mapping metadata from the first file to the second file.

8. The method as claimed in claim 7, which includes the first file system determining whether or not any data block mapping metadata of the first file has been changed since data block mapping metadata was last copied from the first file to the second file by comparing a data block mapping metadata modification time attribute of the first file to a data block mapping metadata modification time attribute of the second file.

9. The method as claimed in claim 1, which includes the second file system manager copying the data blocks of the first file to the second file and updating the data block mapping metadata of the second file in order to provide the application with write access to the second file.

10. The method as claimed in claim 1, which includes the second file system manager copying the data blocks of the first file to the second file and updating the data block mapping metadata of the second file in response to a request for deletion of the first file.

11. A data processing system comprising:
   a first data processor;
   a second data processor coupled to the first data processor for exchange of requests and data; and
   computer data storage coupled to the first data processor and the second data processor for storage and retrieval of data from the first data processor and the second data processor;
   wherein the first data processor is programmed with a first file system manager for managing access to a first file system in the data storage, and the second data processor is programmed with a second file system manager for managing access to a second file system in the data storage,
   wherein the first file system includes a first file, the first file has data blocks in the computer data storage, and the first file has data block mapping metadata mapping the data blocks of the first file to respective addresses in the computer data storage of the data blocks of the first file;
   wherein the second file system manager is also programmed for creating a second file in the second file system, the second file including a copy of the data block mapping metadata in the first file, the second file also including a link to the first file; and wherein the second file system manager is programmed for responding to a request from an application to read a specified data block from the second file by accessing the data block mapping metadata in the second file to obtain a respective address in the computer data storage for the specified data block in the first file, and by formulating a storage access request for reading data from the respective address in the computer data storage of the specified data block in the first file, and sending the storage access request to the computer data storage, and receiving from the computer data storage data read from the respective address in the computer data storage of the specified data block in the first file, and returning to the application the data read from the respective address in the computer data storage of the specified data block in the first file.

12. The data processing system as claimed in claim 11, wherein the first data processor is programmed for providing a network client with read access and write access to the first file, and wherein the application is executable by the second data processor for protecting data of the first file.

13. The data processing system as claimed in claim 11, wherein the second file system manager is programmed for responding to a request from the application to open the second file by the second file system manager obtaining a data storage address of the first file system from the first file system manager.

14. The data processing system as claimed in claim 11, wherein the second file system manager is programmed for responding to a request from the application to open the second file by the second file system manager requesting the first file system manager to place a read lock on the first file, and wherein the second file system manager is programmed for responding to a request from the application to close the second file by the second file system manager requesting the first file system manager to release the read lock on the first file.

15. The data processing system as claimed in claim 14, wherein the second file system manager is programmed for reading data of the first file from the computer data storage without participation of the first file system manager once the second file system manager obtains a read lock upon the first file from the first file system manager.

16. The data processing system as claimed in claim 14, wherein the first file system manager is programmed for responding to the request from the second file system manager for placing a read lock on the first file by placing a read lock on the first file and incrementing a read lock count for the first file, and wherein the first file system manager is programmed for responding to the request from the second file system manger for releasing the read lock by decrementing the read lock count for the first file, and releasing the read lock on the first file once the read lock count indicates zero read locks upon the first file.

17. The data processing system as claimed in claim 14, wherein the second file system manager is programmed for subsequently responding to a request from the application to re-open the second file by sending another request to the first file system manager to place a read lock on the first file, and the first file system manager is programmed for responding to said another request to the first file system manager by placing a read lock on the first file, and also determining whether or not any data block mapping metadata of the first file has been changed since data block mapping metadata was last copied from the first file to the second file.

18. The data processing system as claimed in claim 17, wherein the first file system manager is programmed for determining whether or not any data block mapping metadata of the first file has been changed since data block mapping metadata was last copied from the first file to the second file by comparing a data block mapping metadata modification time attribute of the first file to a data block mapping metadata modification time attribute of the second file.

19. The data processing system as claimed in claim 11, wherein the second file system manager is programmed for responding to a request for copying the data blocks of the first file to the second file by obtaining a read lock on the first file and then copying the data blocks of the first file from the first file system to the second file system and updating the data block mapping metadata of the second file.

20. A data processing system comprising:
a first file server; and
a second file server coupled to the first file server for exchange of requests and data;
wherein the first file server includes a first data processor and first disk storage coupled to the first data processor for storage and retrieval of data from the first data processor;
wherein the second file server includes a second data processor and second disk storage coupled to the second data processor for storage and retrieval of data from the second data processor;
wherein the first data processor is programmed with a first file system manager for managing access to a first file system in the first disk storage, and the second data processor is programmed with a second file system manager for managing access to a second file system in the second disk storage;
wherein the first file system includes a first file, the first file has data blocks in the first disk storage, and the first file has data block mapping metadata mapping the data blocks of the first file to respective addresses in the first disk storage of the data blocks of the first file;
wherein the second file system manager is programmed for creating a second file in the second file system, the second file includes a copy of the data block mapping metadata in the first file, and the second file also includes a link to the first file; and
wherein the second file system manager is programmed for responding to a request from an application of the second file server to read a specified data block from the second file by accessing the data block mapping metadata in the second file to obtain a respective address in the first disk storage for the specified data block in the first file, and by formulating a storage access request for reading data from the respective address in the first disk storage of the specified data block in the first file, and sending the storage access request to the first disk storage, and receiving from the first disk storage data read from the respective address in the first disk storage of the specified data block in the first file, and returning to the application the data read from the respective address in the first disk storage of the specified data block in the first file.

* * * * *